Oct. 17, 1961  J. W. PAGE  3,004,317
ROPE WEDGE SOCKET CONNECTOR
Filed June 4, 1959
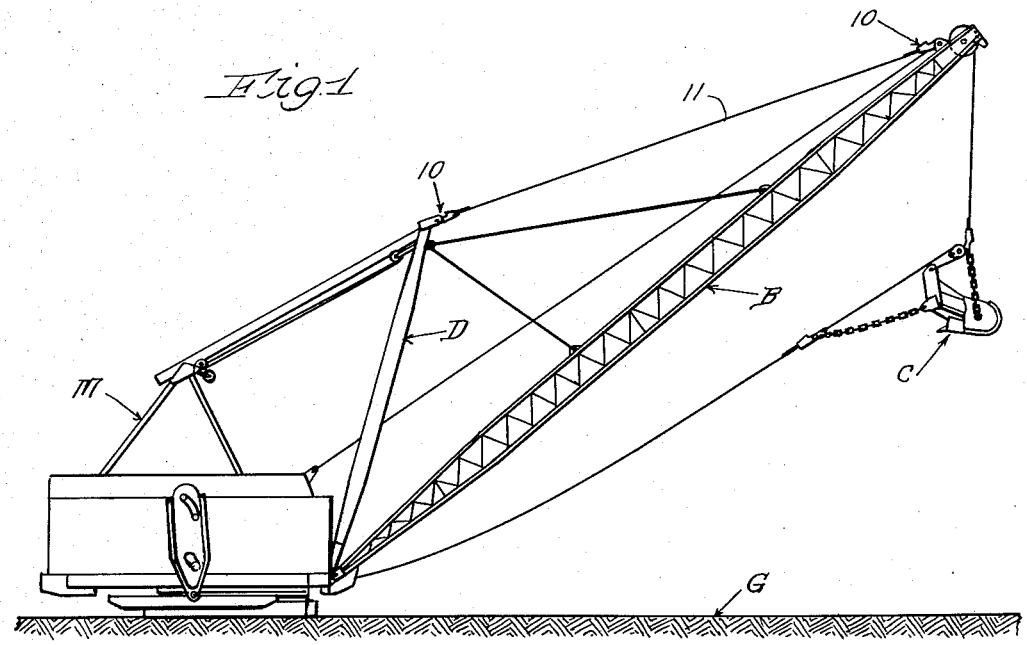
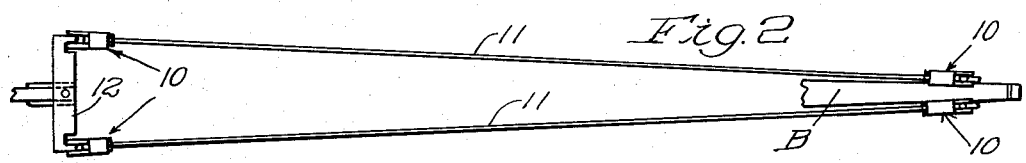
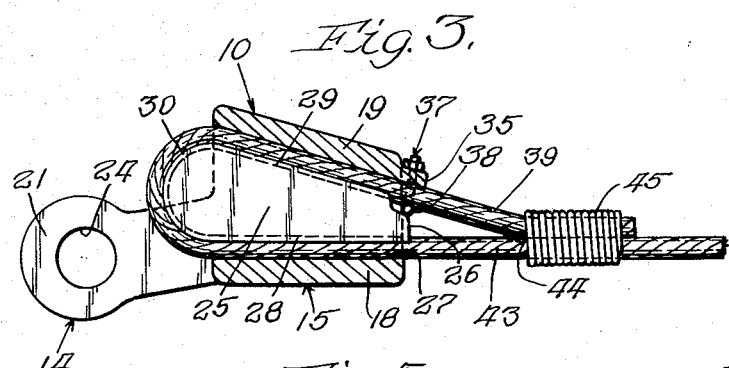
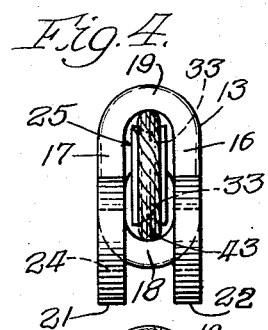
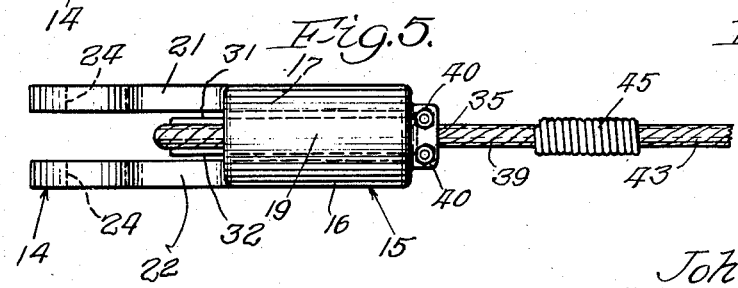
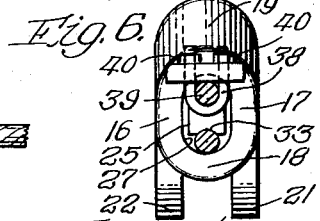
Inventor:
John W. Page,
By H. A. Gray, Brady, Wegner,
Allen & Stellman, Att'ys.

of Illinois

United States Patent Office 3,004,317
Patented Oct. 17, 1961

3,004,317
ROPE WEDGE SOCKET CONNECTOR
John W. Page, Chicago, Ill., assignor to Page Engineering Company, a corporation of Illinois
Filed June 4, 1959, Ser. No. 818,043
3 Claims. (Cl. 24—126)

This invention relates to a wedge socket or connecting device for gripping large diameter wire rope and more particularly to a device for attachment to a wire rope in a predetermined position on the rope for accurate location and also embodying structure to prevent fatigue failure of the wire rope where it enters the attaching device.

Relatively heavy earth moving equipment, such as dragline excavators, use much large diameter wire rope. The rope referred to varies in size from one inch diameter up to as much as three inches diameter and in such sizes, is relatively stiff and quite heavy. The difficulties of connecting such wire rope to parts of the excavating machinery has generally necessitated the use of heavy cast metal sockets and wedges which pinch upon the rope and provide an eye for receiving a pin connecting the wedging device to a part of the machiney. The act of attaching a wedge socket to the rope of necessity requires the leading of the rope through a socket and the driving home of a wedge pinching upon the rope. The particular location at which the socket was applied to the rope was, at best, a matter of approximation and generally not too accurate.

The wedge sockets for use with large diameter ropes are required to carry loads measured in tons or thousands of pounds. Of necessity, the wedge socket devices are quite heavy and are often constructed of high manganese bearing steel in order to withstand the stresses to which they may be subject. The weight of the wedge sockets, per unit of length, is generally several times the weight of the wire rope to which it may be connected. The ropes are heavy enough that they may sag somewhat when used between points of generally the same or similar elevation so that the rope extends in a horizontal direction. In such instances, the wedge sockets being heavier than the rope, tend to cause a local bending in the rope at the point of entrance into the socket. As an example of such use, the booms of dragline excavators are generally supported by cables which extend from a mast extending upwardly from the cab of the excavator, outwardly to the outer end of the boom. The differences in sag of such cables vary considerably, depending upon the amount of load in the excavating bucket suspended from the end of the boom. The dragline buckets are of such size that several tons of material may be lifted off the end of the boom, causing the boom support cables to become quite taut. When this load is dropped, the cables tend to sag in the manner of a catenary. The wedge sockets on the wire rope boom supports, being heavier per unit of length than the wire rope, tend to sag more than the rope itself causing a localized bending and eventual fatigue failure of the rope where it enters the socket.

The structure of the present wedge rope socket avoids the difficulties enumerated above, and it is therefore the principal object of this invention to provide a new and improved wedge rope socket structure.

Another object is to provide a wire rope wedge socket of the character described which may be accurately positioned upon a wire rope in a predetermined position.

Another object is to provide a wedge socket of the character described which may be connected to a wire rope in such a manner that failure of the wire rope due to bending of the rope at its entrance to the socket is avoided.

Other features and advantages of this invention will be apparent from the following detailed description taken in connection with the accompanying drawings, wherein:

FIGURE 1 is a side elevational and partially diagrammatic view at a much reduced scale of a large dragline excavating machine showing the device of this invention as used in such an earth moving machine;

FIGURE 2 is a plan view of the boom suspension cables and their attachments as shown in FIGURE 1, at a slightly larger scale and showing the stress-equalizing bar with wire rope wedge sockets at each end of the ropes;

FIGURE 3 is a fragmentary side sectional view of one rope wedge socket having the invention therein;

FIGURE 4 is an end view of the device shown in FIGURE 3 taken from the left-hand side of FIGURE 3;

FIGURE 5 is a top plan view of the device as shown in FIGURE 3, and

FIGURE 6 is an end view of the device as shown in FIGURE 3 taken from the right-hand side of FIGURE 3 and showing the ropes in section.

In the preferred embodiment illustrated, two pairs of cast metal sockets are used to connect two support lines for a boom in a large dragline excavating machine generally designated M. Two support lines are needed to properly hold the extremely large weight placed upon the boom B by the dragline bucket C. In order to insure a generally equal stress across both of these lines, a pivotal equalizing bar is placed at one end of the lines near the top of the mast D to connect to each rope wedge socket. The socket should be accurately positioned upon the wire ropes to obtain equal lengths of cable or rope from the stress-equalizing bar to the outer end of the boom. The dragline machine illustrated is of the walking type sitting directly on the ground G. The boom is long, permitting considerable area to be reached at one location of the dragline excavator.

In FIGURES 1 and 2 of the drawing, rope wedge sockets, each generally designated 10, are shown at each end of a pair of boom support lines 11.

The two lines preferably are of the same length and are equally stressed to support the boom and its load. An equalizing bar 12 of relatively short length may be attached to the upper portion of the mast M about a generally vertical pivot with the boom support lines pivoted to the outer ends of the bar on opposite sides of its pivot. In the past, a single line has been used, passing around a large diameter sheave mounted in place of the equalizing bar. It has been found that such lines have been fatigue stressed at the point of tangency of the line to the sheave and to such an extent that strands were actually broken at these points requiring too frequent replacement of the boom support line. The ability to use separate equal length lines with the rope wedge sockets of this invention has permitted the substitution of the equalizing bar for previously used sheave, obviating the difficulties previously experienced.

The particular form of the rope wedge socket of this invention is used at each end of the boom support lines in the illustrated dragline excavator. The socket structure is more particularly illustrated in FIGURES 3 to 6.

The rope wedge socket comprises a housing 13 having an attaching eye portion 14 at one end and a socket portion 15 at the opposite end. The socket portion is open at its opposite ends and is defined by cast side walls 16 and 17 joined by curved end walls 18 and 19. The end walls 18 and 19 taper toward each other and toward the end of the housing away from the eye portion. The side walls 16 and 17 are generally parallel and closer together than the end walls 18 and 19. The side walls are extended as at 21 and 22 to form a pair of spaced arms having aligned openings 24 forming the attaching eye portion 14 to receive a pin for securing the socket in proper relation to the excavating machine. The housing may be fabricated but preferably is cast of high manganese bearing steel particularly in the larger sizes.

A wedge 25 is shaped generally to enter the socket. The width of the wedge is such that it may slide freely longitudinally of the socket between the side walls 16 and 17. A continuous grooved surface extends about most of the wedge to receive the wire rope. This surface extends from a blunt end 26 adjacent the front end 27 of the socket and includes a wedge surface 28 generally parallel to the socket wall 18, and an opposite wedge surface 29 generally parallel to the side wall 19 of the wedge socket. The wedge surfaces are joined by a rounded rearward end portion 30. The side walls 31 and 32 of the wedge are generally parallel to each other and to the adjacent wedge socket walls 16 and 17. The wedge surfaces 28 and 29, as well as the rounded rearward surface 30 are grooved as indicated by the semicircular surface 33, illustrated in FIGURES 4 and 6, to seat the wire rope for wedging against the bearing surfaces of the socket.

The load bearing portion of the boom support line enters the wedge socket through the smaller end and extends around the wedge, laying in the groove on the wedge and returns back through the smaller end of the socket. The main line is in alignment with the eye in the attaching portion 14. To bring the socket and wire rope together requires that a length of rope be looped through the socket back beyond the eye portion, the wedge inserted in position, after which the rope is pulled itno the socket to a position as shown in FIGURE 3. In such operation, it was practically impossible to preselect the position of the socket on the rope as the act of pulling the socket onto the rope would cause one side or the other to slip more, thus changing the position of the socket relative to the rope or cable.

In the present invention, means are provided to permit selection of the position of the socket on the rope. In order to secure the socket in a preselected position upon the wire rope, a clamp is used to hold a portion of the rope in selected position relating to the socket while permitting the socket and rope to be properly seated together. The clamp has a flange 35 extending outwardly from the housing end portion and integral therewith. Two bored holes extend through the flange to receive a U-bolt 37 inserted through the holes. The U-bolt has a bail portion 38 extending inwardly of the socket for passing about the loose end 39 of the wire rope in the socket. The U-bolt is secured to the flange by a pair of nuts 40 which can be threadably fastened upon the bolt ends. The U-bolt is secured to the housing at the front, so that a workman may measure from the U-bolt to the free end of a cable or rope quite easily. Once the desired measurement is made to place the socket in desired position on the rope, the U-bolt can hold the socket on the wire rope during wedging of the rope and wedge into the socket. The result is an predetermined position of the socket on the rope and a desired length of rope beyond the socket.

In order to prevent the wire rope from bending at the entrance to the socket causing localized fatigue failure, the free end 39 of the wire rope is lashed at a predetermined point 44 to the main rope line 43, spaced from the socket. In the embodiment shown, the free end and the main line may be joined approximately one foot from the socket and are secured together by lashing 45 wrapped thereabout. The triangle formed by the portions of the rope between the lashing and the socket, with the socket forming the third side, insures that the main line will not bend locally at its entrance into the socket when the line sags due to removal of weight from the boom. The socket is relatively heavier than the rope, however, the effect of its weight on the rope is spread over a length of rope and not concentrated as heretofore.

While I have shown and described a preferred embodiment of my invention, it is to be understood that it is capable of many modifications. Changes, therefore, in the construction and arrangement may be made without departing from the spirit and scope of the invention as disclosed in the appended claims.

I claim:

1. A wire rope wedge socket for positive fastening to a wire rope in a predetermined position, comprising: a housing having an attaching eye portion at one end and a socket portion at the opposite end, said socket portion being open at its opposite ends and having a pair of opposite walls tapering toward each other and tapering inwardly toward the end of the housing away from said eye portion; a wedge shaped to enter the socket portion and having opposite walls generally parallel to said tapered socket walls for wedging wire rope portions against said socket walls when the rope passes around the wedge; and a U-bolt clamp integrally connected to the socket portion and having a bail portion extending inwardly of the socket for passing about a wire rope in the socket to clamp the socket to a wire rope at a predetermined position on the rope, said clamp holding the position of said socket on the wire rope during wedging of the rope and wedge into said socket.

2. A wire rope wedge socket for positive fastening to a wire rope in a predetermined position, comprising: a housing having an attaching eye portion at one end and a socket portion at the opposite end, said socket portion being open at its opposite ends and having a pair of opposite walls tapering toward each other and tapering inwardly toward the end of the housing away from said eye portion; a wedge shaped to enter the socket portion and having opposite walls generally parallel to said tapered socket walls for wedging wire rope portions against said socket walls when said wire rope enters the socket opening away from said eye portion and extends around the wedge to lay along the tapered walls and returns out of the socket through the opening from which it entered to extend beyond the socket portion a predetermined length; a U-bolt clamp integrally connected to the socket portion adjacent an outgoing end of said wire rope and having a bail portion extending inwardly of the socket portion for passing about an outgoing end of the said wire rope to clamp the socket to the wire rope at a position as determined by the length of the outgoing wire rope which may extend from the socket, said clamp holding the position of said socket on the wire rope during wedging of the rope and wedge into said socket.

3. A wire rope wedge socket for positive fastening to a wire rope in a predetermined position, comprising: a hollow housing having an attaching eye portion at one end and a socket portion at the opposite end, said socket portion being open at its opposite ends and having a pair of opposite walls tapering toward each other and towards the end of the housing away from said eye portion; a wedge shaped to enter the socket portion and having opposite walls generally parallel to said tapered socket walls for wedging wire rope portions against said socket walls and said wedge walls when the wire rope enters the smaller socket opening and extends around the wedge to lay along the tapered socket walls and returns out through the opening from which it entered to extend a free end thereof beyond the socket portion a predetermined length, said tapered walls of said socket and wedge being arranged to direct the free end of the rope to meet the entering portion of the rope at a point spaced from the socket to permit lashing said free end and an entering rope line together at said meeting point thereby forming a triangular rope truss to prevent localized bending of the wire rope at the socket entrance during loading and unloading of the main wire rope; a U-bolt clamp integrally connected to the socket portion adjacent the outgoing end of said wire rope and having a bail portion extending inwardly of the socket portion for passing about the outgoing end of the said wire rope to clamp the socket to the wire rope at a position as determined by the length of the outgoing wire rope extending beyond the socket, said clamp holding the position of the said socket on the wire rope during wedging of the rope and wedge into the said socket as caused by loading the wire rope; said eye portion of said socket being in longitudinal alignment with the longitudinal center line of said main rope line to avoid interference by the truss with the main line loading of the rope.

References Cited in the file of this patent

UNITED STATES PATENTS

| | | |
|---|---|---|
| 1,020,749 | Fisher | Mar. 19, 1912 |
| 1,090,377 | Blackburn | Mar. 17, 1914 |
| 1,341,438 | Pope | May 25, 1920 |
| 1,715,056 | Clark | May 28, 1929 |
| 1,758,948 | Helm | May 20, 1930 |

FOREIGN PATENTS

| | | |
|---|---|---|
| 450,994 | Great Britain | July 28, 1936 |
| 640,070 | Germany | Dec. 22, 1936 |
| 1,128,829 | France | Aug. 27, 1956 |